US008340737B1

(12) United States Patent
Arndt et al.

(10) Patent No.: US 8,340,737 B1
(45) Date of Patent: Dec. 25, 2012

(54) HIGH TEMPERATURE SUPERCONDUCTOR CURRENT LEAD FOR CONNECTING A SUPERCONDUCTING LOAD SYSTEM TO A CURRENT FEED POINT

(75) Inventors: Tabea Arndt, Erlangen (DE); Martin Munz, Alzenau (DE); André Aubele, Hanau (DE); Bernd Sailer, Alzenau (DE)

(73) Assignee: Bruker HTS GmbH, Hanau (DE)

( * ) Notice: Subject to any disclaimer, the term of this patent is extended or adjusted under 35 U.S.C. 154(b) by 334 days.

(21) Appl. No.: 12/805,418

(22) Filed: Jul. 30, 2010

(30) Foreign Application Priority Data

Aug. 10, 2009  (DE) .......................... 10 2009 028 413

(51) Int. Cl.
*H01L 39/24* (2006.01)

(52) U.S. Cl. ........................................ 505/220; 505/231

(58) Field of Classification Search .................. 505/220, 505/230, 231
See application file for complete search history.

(56) References Cited

U.S. PATENT DOCUMENTS

| 4,164,671 | A | * | 8/1979 | Gamble | ........................... 310/52 |
| 4,965,246 | A | | 10/1990 | Suzawa | |
| 5,697,220 | A | * | 12/1997 | Pierce et al. | ..................... 62/45.1 |
| 5,742,217 | A | * | 4/1998 | Bent et al. | ....................... 335/216 |
| 6,034,324 | A | * | 3/2000 | Dixon et al. | .................... 174/15.4 |
| 6,153,825 | A | * | 11/2000 | Ando et al. | .................... 174/15.4 |
| 7,531,750 | B2 | | 5/2009 | Kellers | |
| 2004/0010909 | A1 | * | 1/2004 | Emanuel et al. | ............. 29/623.3 |
| 2007/0000787 | A1 | * | 1/2007 | Siljan et al. | ..................... 205/381 |
| 2007/0144765 | A1 | | 6/2007 | Kellers | |
| 2010/0038131 | A1 | * | 2/2010 | Belton et al. | ..................... 174/650 |

FOREIGN PATENT DOCUMENTS

| JP | 5 218 513 | 8/1993 |
| JP | 2002 064014 | 2/2002 |

* cited by examiner

*Primary Examiner* — Colleen Dunn
(74) *Attorney, Agent, or Firm* — Paul Vincent

(57) ABSTRACT

A current lead (1) for connecting a superconducting load system (5), in particular, a magnet coil, to a current feed point (3*a*) that is at a higher temperature than the load system (5) comprises a flat, elongated carrier (6) and a plurality of mechanical and electrical parallel high-temperature superconductors (HTSC) (10), wherein the HTSCs (10) are disposed side by side on the carrier (6). The carrier (6) is made of stainless steel, and a plurality of HTSCs (10) are each disposed side by side on two opposite carrier (6) sides of the carrier. The carrier (6) is constituted in the shape of a plate with cut-outs (15; 15*a*-15*d*). The current lead has a high current capacity and low thermal conductivity and provides improved emergency conduction properties in case of failure of the superconductivity in the HTSC.

17 Claims, 6 Drawing Sheets

HIGH TEMPERATURE SUPERCONDUCTOR CURRENT LEAD FOR CONNECTING A SUPERCONDUCTING LOAD SYSTEM TO A CURRENT FEED POINT

This application claims Paris Convention priority of DE 10 2009 028 413.3 filed Aug. 10, 2009 the complete disclosure of which is hereby incorporated by reference.

BACKGROUND OF THE INVENTION

The invention relates to a current lead for connecting a superconducting load system, in particular, a magnet coil, to a current feed point that is at a higher temperature than the load system, comprising
 a flat, elongated carrier and
 a plurality of mechanical and electrically parallel high-temperature superconductors (HTSC),
wherein the HTSCs are disposed side by side on the carrier.

The generic prior art is disclosed in DE 10 2005 058 029 A1.

Superconducting load systems are deployed wherever (usually strong) electrical currents must flow with low electrical resistance. One important superconducting load system is superconducting magnet coils, which are used to produce strong magnetic fields, for example, for NMR spectrometers or MRI tomographs. The superconducting load system must be kept at a cryogenic temperature for operation so that the superconducting material in the load system can be kept below its critical temperature Tc. The superconducting load system must be refrigerated with cryocoolers for this purpose; the necessary cooling power or the energy required to provide the cooling power is a considerable cost factor.

Electric current is fed into the superconducting load system during start-up or also during operation. For this purpose, current leads are used. Current leads should therefore provide a current path with good electrical conductivity. Current leads connect a current feed point to the superconducting load system at the cryogenic temperature.

Because the current sources (such as the local power supply network) usually provide their connections at room temperature, the current lead always provides a thermal conduction path to the superconducting load. The associated heat input increases the cooling power requirement of the superconducting load.

Normally, graduated cooling is provided for the power supply. The first end of the current lead, nearest to the current feed point, or the corresponding first connection element is kept at a medium low temperature (for example, 50 to 90 K) by a first cryocooler or a first stage of a cryocooler. The second end of the current lead near to the superconducting load or a corresponding second connection element is kept at the temperature intended for the superconducting load (usually 1 to 30 K) by a second cryocooler or a second stage of a cryocooler. This graduated cooling already considerably reduces the cooling power requirement.

The current lead disclosed in DE 10 2005 058 029 A1 is an FRP (fiberglass reinforced plastic) carrier comprising two identical plates, between which strip-shaped, mutually parallel high-temperature superconductors (HTSC) are disposed. The HTSCs extend in the longitudinal direction of the FRP carrier. The ends of the HTSCs are connected electrically-conductively each with a connection element. The strip-shaped HTSCs each comprise a normally conducting current path.

The disadvantage of this current lead is the relatively low superconducting current capacity relative to the dimensions and, furthermore, if the superconductivity is no longer ensured in the HTSC (quench), the emergency conducting properties are weak.

It is the object of this invention to provide an HTSC current lead with a high current capacity and low thermal conductivity that provides improved emergency conduction properties in case of failure of the superconductivity in the HTSC.

SUMMARY OF THE INVENTION

This object is solved by a current lead of the type stated above characterized in that,
 the carrier is made of stainless steel,
 a plurality of HTSCs are each disposed side by side on two opposite carrier sides of the carrier and
 the carrier is constituted in the shape of a plate with cut-outs.

The invention proposes a redesign of HTSC current leads with which the properties of current conduction are greatly improved. The inventive current lead has a plurality of high-temperature superconductors (HTSCs or HTSC wires) whose critical temperature is $T_c \geq 30K$. The superconducting current capacity relevant for normal operation is determined by the HTSC. The carrier is used as a support for the (typically strip-shaped) HTSCs and provides a mechanical base frame. The thermal conductive properties are also determined by the carrier.

According to the invention, the carrier is made of stainless steel. If the superconductivity is no longer ensured on one or more of the HTSCs (in case of quenching), the carrier made of stainless steel maintains a current path of electrical current capacity due it its ohmic electrical conductivity so that the local heat development at the location of origin of the quench can be better controlled, thus being able to protect the HTSC from damage due to overvoltage and overheating. A normally conducting current path in each individual HTSC that is the main source of heat input through the HTSCs in prior art, can be dimensioned to be considerably narrower in the invention because it is load-relieved by the current path in the carrier in case of quenching. In an extreme case, the normally conducting current path is actually unnecessary and can be eliminated.

At the same time, stainless steel has relatively low thermal conductivity (with respect to its electrical conductivity), so that this already ensures a heat input into the superconducting load that is quite low. The heat flow that is input through the refrigerated user system via the inventive current lead is further minimized by cut-outs in the carrier. The cut-outs themselves reduce the thermal conduction paths available in the current lead while generating bottlenecks for thermal conduction in the carrier around the cut-outs. The inventive measures result in a reduction of the costs for cooling a connected superconducting load system. The cut-outs additionally reduce the weight and the material requirement for the carrier.

Due to the inventive two-sided use of the carrier by mounting HTSCs, a large number of HTSCs can be fitted in the current lead. The useful superconducting current capacity of the inventive current lead is thus correspondingly large.

In the invention, the carrier is included in the functionality of the current lead to a greater extent and the properties resulting from the structure of the carrier are considered to a greater degree in the design of the current lead, permitting simple improvement of the properties of the current lead.

The plate-shaped carrier with cut-outs is essentially flat, elongated and cuboidal. The outer width, outer height, and outer length of the plate-shaped carrier describe the (smallest) enveloping cuboid into which the plate-shaped carrier would just about fit. The region not occupied by the carrier material in this cuboid (that is, the space defined by the extent of the outer width, outer height, and outer length) are the cut-outs of the carrier. In the invention, the ratio of outer width to outer height is typically 3:1 or more and the ratio of outer length to outer width is typically 4:1 or more.

In a preferred embodiment of the inventive current lead, at least 40%, preferably at least 60% of the space defined by the outer length, the outer width and the outer height of the carrier is occupied by cut-outs. Because of this proportion of cut-outs and the concomitant reduction in material, a reduction in heat flow of an at least similar proportion can be achieved, compared with a plate-shaped (flat and elongated, cuboidal) carrier that does not have cut-outs.

An embodiment is also preferred in which one or more sections of the length of the carrier are provided in which at least 70%, preferably at least 85% of the cross-sectional area defined by the outer width and outer height of the carrier is occupied by cut-outs. The section or sections that comply with the said conditions with respect to their cross-sectional area preferably occupy at least 10%, in particular preferably at least 25%, of the outer length of the carrier. According to this embodiment, one or more "bottlenecks" are provided in the carrier, in which the cross-sectional area contributing to thermal conduction (perpendicular to the longitudinal extent) is reduced locally as compared to the cross-sectional area defined by the outer height and outer width of the carrier. The bottleneck or bottlenecks typically determine and limit the thermal conduction of the carrier so that other requirements (such as the mechanical stability) can be prioritized in other aspects of design of the carrier.

An embodiment is also preferred in which the carrier is constituted in the shape of a meander. The meander shape is achieved by cut-outs that are formed starting from one of the upright sides of the carrier, transverse with respect to its longitudinal direction, over the full height of the carrier, and alternating between the upright sides in the longitudinal direction. In particular, the cut-outs can extend in the direction of the opposite upright side beyond the center of the carrier. The meander shape makes the thermal conduction path considerably longer than the outer length of the carrier and the thermal resistance is correspondingly higher.

In an advantageous embodiment, at least some of the cut-outs are constituted as slots in the longitudinal direction of the carrier, in each of which, one HTSC is disposed. The longitudinal slots facilitate positioning of the HTSC. The side walls of the elongated slots protect the HTSC from mechanical damage.

An especially preferred embodiment of the inventive current lead is characterized in that the carrier is made of a U-section that is open on one upright side of the carrier.

In other words, the carrier is based on a U-section. A U-section advantageously provides large areas on the leg sides (outer sides) that can be used as a support for the HTSCs, with a small carrier material cross-section.

In a further variant of this embodiment, the outer sides of the U-section each have meander-shaped slots. In this way, the thermal conduction path is effectively lengthened as compared with the outer length of the U-section.

A further variant of the embodiment described above is also preferred in which slots that are transverse to the longitudinal direction are provided on the base side of the U-section, distributed over the longitudinal direction of the carrier. These slots reduce the cross-section of the U-section locally occupied by the carrier material which, in turn, reduces the heat flow along the U-section.

An embodiment is also especially preferred in which the current lead has two connection elements, in particular made of copper, that are soldered onto the carrier in the region of the longitudinal ends of the carrier. Through the connection elements, the current is conducted into the HTSC; the current lead is usually also cooled through the connection elements. Copper as the material for the connection elements provides high electrical conductivity at low cost. To solder the connection elements onto the carrier, solders containing silver are usually used that are well suited to the copper connection elements. Solders of type L-Ag72 are preferably used. The connection elements are fitted to the carrier, for example, by butt-joining at the end faces. A flat recess can also be provided in the connection elements, resulting in an approximately stepped contact surface with the carrier. A transverse slot is also conceivable that is milled into the connection elements and finds a protrusion on the outer side of the carrier as a mating element, or vice versa.

In one embodiment of the inventive device, the HTSCs are constituted in a strip-shape and, in particular, are disposed flat on the carrier side. This configuration affords the HTSCs protection because a surface that may be subject to mechanical loads is kept small. Moreover, this arrangement provides a large contact surface between the HTSCs and the carrier. Alternatively, HTSCs of the round conductor type can also be used.

An embodiment is also preferred in which the HTSCs contain

Bi-2212 or Bi-2223, in particular, in either case, of type PIT (powder in tube) with an Ag or Ag/Au coating or YBCO, in particular, of type "coated conductor."

or $MgB_2$.

These materials have proven their worth in practice and can be very well included in line with invention.

Further advantages of the invention can be derived from the description and the drawing. Equally, the characteristics stated above and the characteristics stated below according to the invention can be used singly or multiply in any combination. The embodiments shown and described are not intended as an exhaustive list but as examples to illustrate the invention.

The invention is shown in the drawing and is explained in more detail using the examples. The figures show:

BRIEF DESCRIPTION OF THE DRAWING

FIG. 2c: a schematic longitudinal section diagram of the current lead of FIG. 2a along intersecting plane A-A according to 2a;

DESCRIPTION OF THE PREFERRED EMBODIMENT

Figure 1:
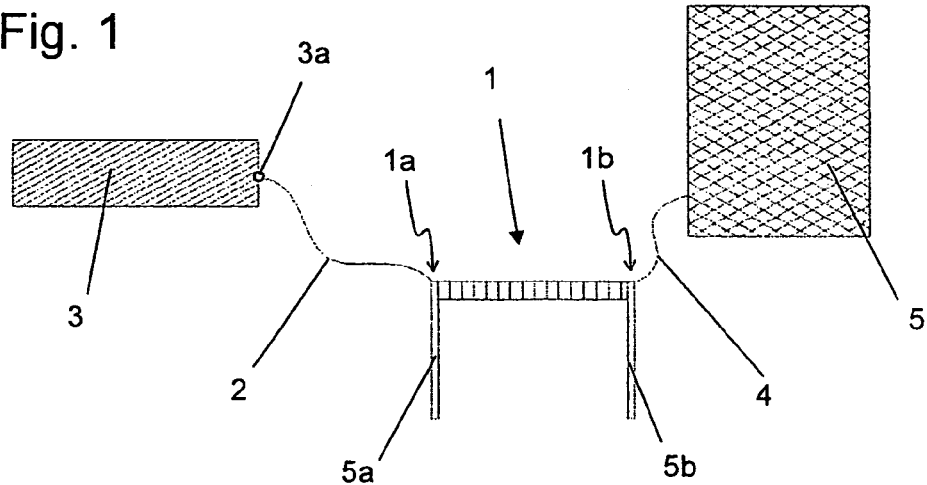
FIG. 1: a schematic diagram of an inventive current lead that is connected to a current source and a superconducting load.

FIG. 1 schematically shows a configuration in which a superconducting load 5, in this case a superconducting magnet, is connected to a current feed point 3a through an inventive current lead 1.

From the current feed point 3a, which is at room temperature in this case and is provided on a current source 3, a first conductor 2, for example, a copper conductor, goes to a first end 1a of the current lead 1; there, a first connection element (not shown in greater detail) is provided. In the region of the first end 1a, a connection 5a is provided on a first cryocooler (not shown), which cools the first end 1a to a medium low temperature T1 of approx. 50 to 90 K (max. 35 K for MgB2 in the HTSC). The temperature T1 should be below the critical temperature of the HTSC in the current lead 1.

At a second end 1b of the current lead 1, there is a connection 5b to a second cryocooler (not shown) that cools the second end 1b to a cryogenic temperature T2 of approx. 1 to 30 K; the temperature T2 should be at least approximately as cold as the operating temperature of the superconducting load 5. Instead of the first and second cryocooler, it is also possible to use one cryocooler with a first and a second cooling stage (not shown).

A connection element constituted at the second end 1b (not shown) is connected to the superconducting load 5 by a second conductor, for example, an HTSC cable or low-temperature superconductor cable.

The FIGS. 2a to 2e illustrate a first embodiment of an inventive current lead 1.

Figure 2A:
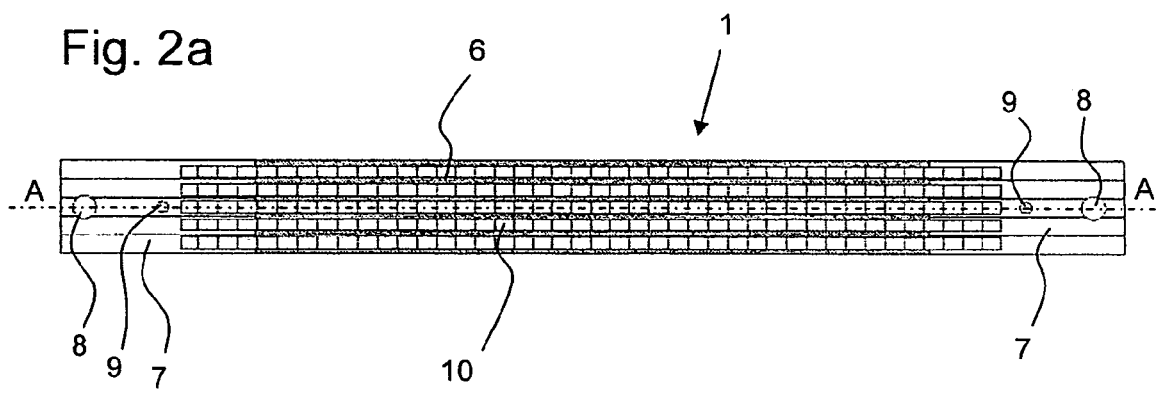
FIG. 2a: a schematic diagram of an inventive current lead in plan view.
Figure 2B:
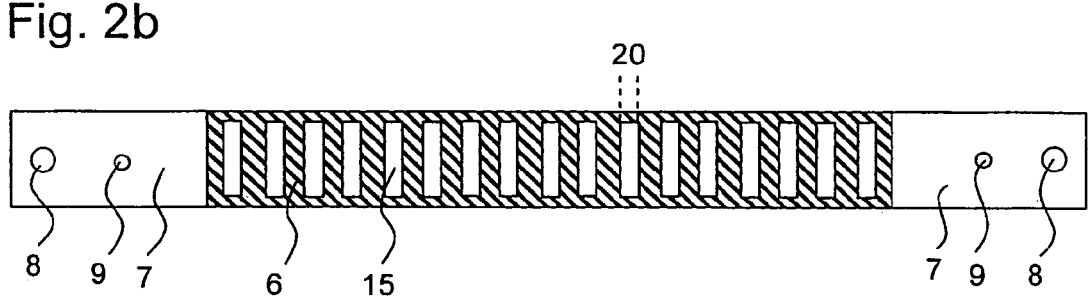
FIG. 2b: a schematic diagram of an inventive current lead in the plan view of FIG. 2a but without HTSCs.
Figure 2C:
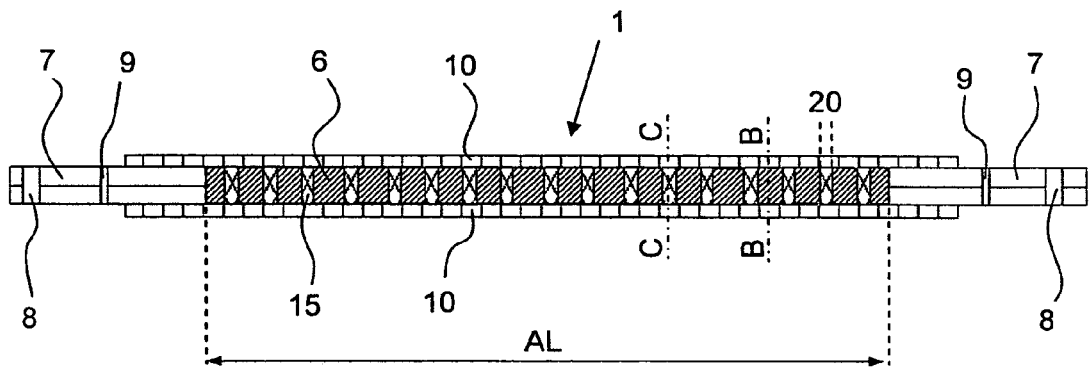

As can be seen from the plan view FIG. 2a and from the longitudinal section FIG. 2c (cf. intersecting plane A-A in FIG. 2a), the current lead 1 includes a carrier 6 made of stainless steel ("flat steel support"), in particular, made of steel DIN 1.4306, DIN 1.4404, DIN 1.4571, DIN 1.4435, AISI 316L, AISI 304L, or AISI 316LN, which is soldered to connection elements 7 at its longitudinal ends. The connection elements 7 have drill-holes 8 for mounting current contacts and potential taps 9.

Both on the top side and the underside of the carrier 6, a plurality (in this case five) of high-temperature superconductors (HTSC) 10 are disposed that are connected by means of a soldered connection both with the carrier 6 and with the connection elements 7. The solder used is preferably SnAg4 solder. Solders can also be used with a melting point <200° C. (for example, solders from Fusion GmbH, type solder paste SSX 430-830).

The carrier 6 is used as a support for HTSC 10 and takes up mechanical loads that act on the current lead 1. It must be noted that the carrier 6 and the HTSC 10 should have similar heat expansion properties because otherwise damage could occur due to differing expansions caused by temperature fluctuations, in particular, during initial cooling of the current lead.

As can be seen from FIG. 2b, which shows the plan view of FIG. 2a with the HTSCs omitted, and FIG. 2c, the carrier 6 has a plurality of cut-outs 15 that extend perpendicularly with respect to the longitudinal direction (the longitudinal direction extends from left to right in FIGS. 2a, 2b, and 2c) of the carrier 6. In the embodiments shown, a total of seventeen cut-outs 15 are distributed over the outer length AL of the carrier 6.

Figure 2D:
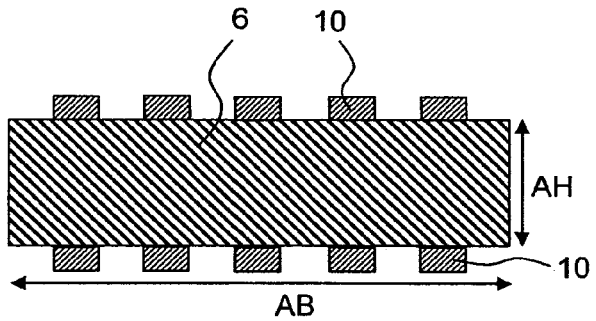
FIG. 2d: a schematic transverse section diagram of the current lead of FIG. 2a along intersecting plane B-B according to 2c.
Figure 2E:
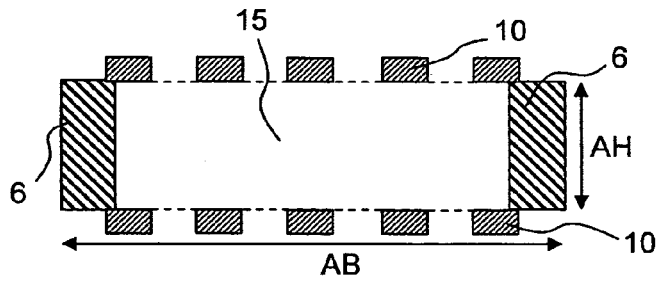
FIG. 2e: a schematic transverse section diagram of the current lead of FIG. 2a along intersecting plane C-C according to 2c.

FIG. 2e shows a transverse section through the current lead 1 at the height of a cut-out 15 (cf. intersecting plane C-C in FIG. 2c). The outer contours of the carrier 6, with an outer height AH and an outer width AB, define a cross-sectional area that is occupied by the carrier material at lateral webs only; approx. 80% of the defined cross-sectional area is occupied by the cut-out 15. In an associated section 20 along the longitudinal direction of the carrier 6, that is, over the longitudinal extent of each cut-out 15 (cf. FIGS. 2b and 2c), thermal conduction is therefore heavily restricted because it can only occur through the "bottlenecks" of the two webs. The cut-outs 15 are continuous in the vertical direction. Most of the HTSCs 10 bridge the cut-out 15 completely; the edge HTSCs are partly lying on the webs.

FIG. 2d shows a transverse cross-section through the current lead 1 between two cut-outs (cf. intersecting plane B-B in FIG. 2c). In this region, the entire cross-sectional area defined by the outer height AH and the outer width AB is occupied by the carrier material. In this region, the HTSCs 10 lie directly on the carrier 6 and are soldered onto the surface of the carrier 6 in this embodiment.

Figure 3:
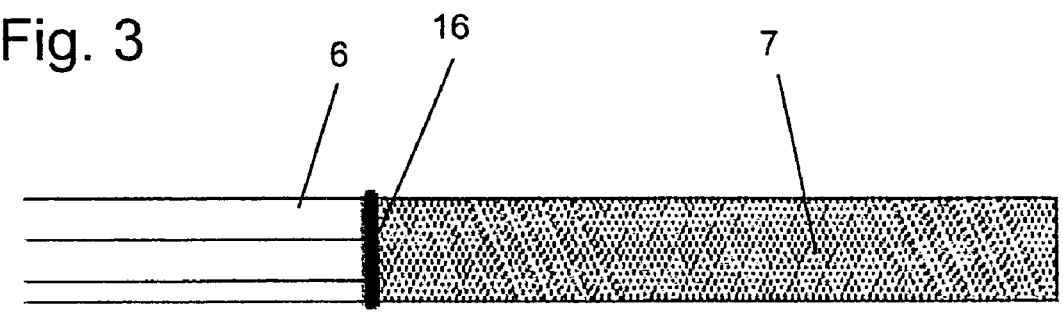
FIG. 3: a schematic longitudinal section diagram of a butting soldered connection between a carrier and a connection element for the invention.

FIG. 3 illustrates, in a longitudinal section view, a first possibility for mounting a connection element 7 on a carrier 6 as part of the invention. The carrier 6 and the connection element 7 are soldered together at their face ends (butting ends).

The soldered connection 16 is (irrespective of the shape of the soldered connection) preferably implemented with solders containing silver, in particular, solder type L-Ag72. The connection element 7 is (irrespective of the shape of the soldered connection) preferably made of Ag, Cu, or Au, or of alloys of the said materials; optionally, a connection element 8 can be coated with one of the materials Ni, Ag, or Au.

Figure 4:
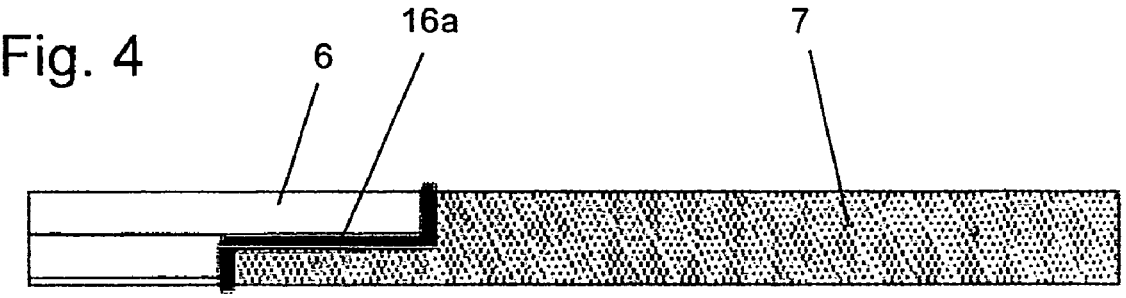
FIG. 4: a schematic longitudinal section diagram of a stepped soldered connection between a carrier and a connection element for the invention.

An alternative mounting of a connection element 7 is depicted in FIG. 4. In this case, the carrier 6 and the connection element 7 each form, in the longitudinal section, approximately L-shaped edges so that an approximately S-shaped (stepped) contact surface is provided between the two components. The soldered connection 16a extends over the entire S-shaped contact surface and is noticeably larger than the contact surface in case of contacting on the end face only.

Figure 5A:
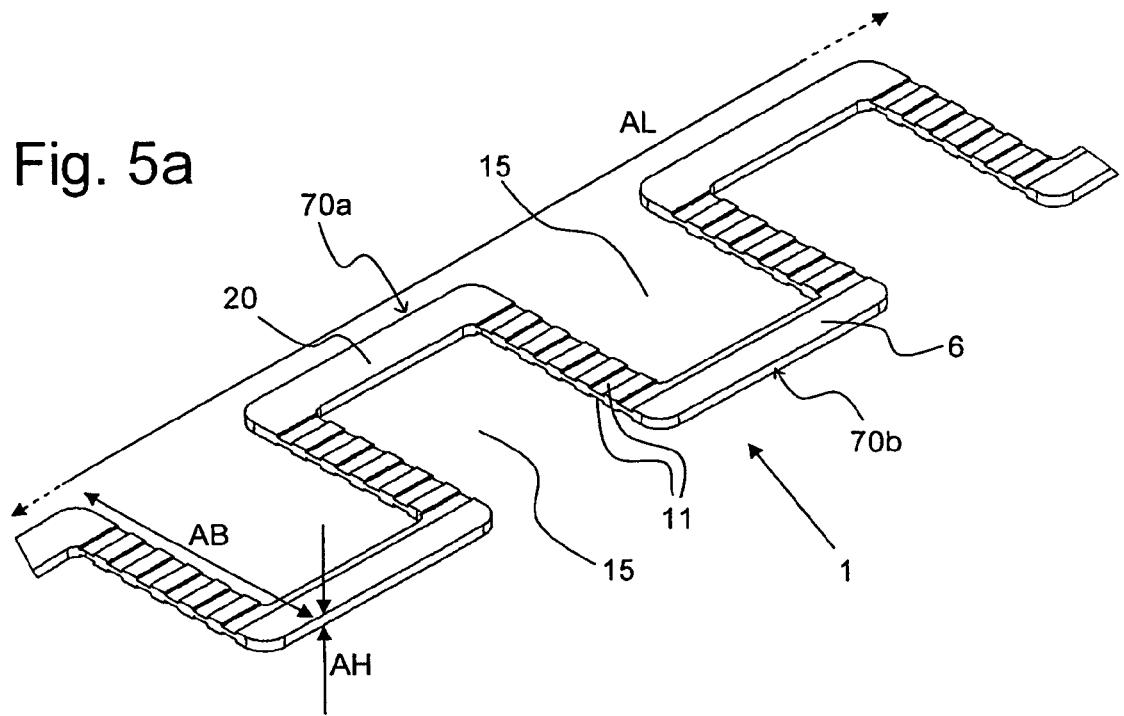
FIG. 5a: a schematic perspective view of a further inventive current lead with a meander-shaped carrier and longitudinal slots, shown without HTSCs.
Figure 5B:
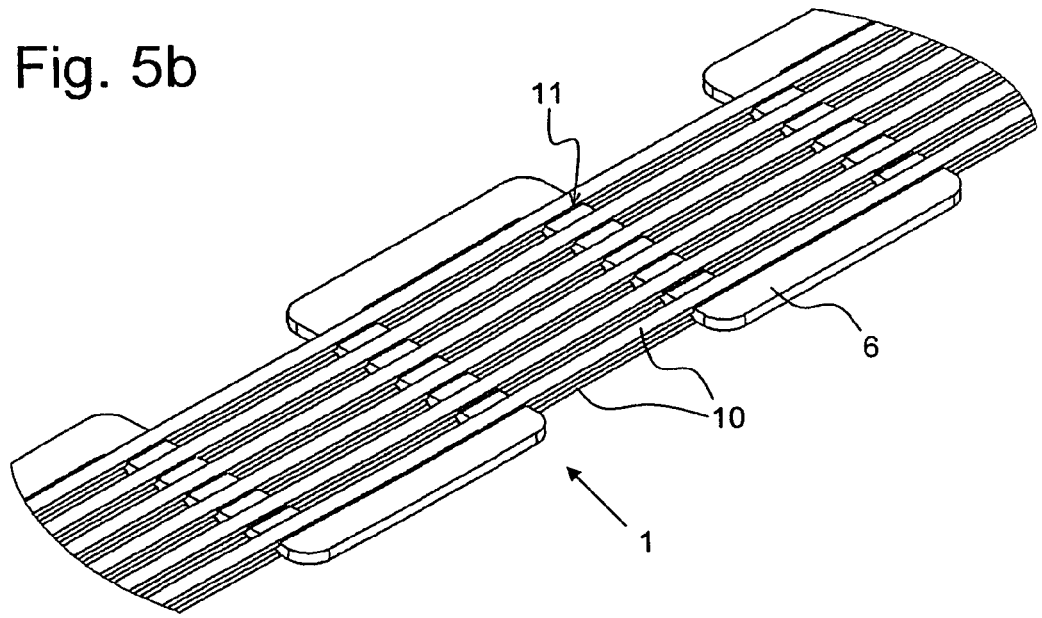
FIG. 5b: the current lead of FIG. 5a, shown with HTSCs.

A second embodiment of the inventive current lead 1 is shown in a schematic perspective view in FIG. 5a (without HTSC) and FIG. 5b (with HTSC).

The carrier 6 of the current lead 1 has a meander-shaped structure. Alternating cut-outs 15 each project from the two opposite upright edges 70a, 70b into the space defined by the outer length AL, the outer height AH, and the outer width AB of the carrier 6. The cut-outs 15 extend over the entire outer height AH (that is, the cut-outs are continuous in the vertical direction in FIG. 5a). The carrier 6 therefore extends in sections that are parallel to the longitudinal extent (cf. section 20) and in sections that are transverse with respect to the longitudinal extent of the carrier 6; the carrier 6 therefore extends in a meandering path. In the case of a completely meander-shaped carrier 6, as is described here, the length of this meandering path is approx. three times longer than the outer length AL of the carrier 6, which provides a correspondingly higher thermal resistance.

In the sections of the carrier 6 that extend transversely with respect to the longitudinal extent of the carrier, further cut-outs, that is, longitudinal slots 11, are constituted in the top side and the underside of the carrier 6 (e.g. by milling).

As seen in FIG. 5b, in this case, the longitudinal slots 11 have a depth that approximately corresponds to the height of the HTSCs 10 that are disposed on the carrier 6. The HTSCs 10 are carried in the longitudinal slots 11, which facilitates manufacturing, and the HTSCs 10 are mechanically stabilized and protected by the side walls of the longitudinal slots 11. The longitudinal slots 11 also reduce the thermal conductivity of the carrier 6 along the meandering path.

Figure 6:
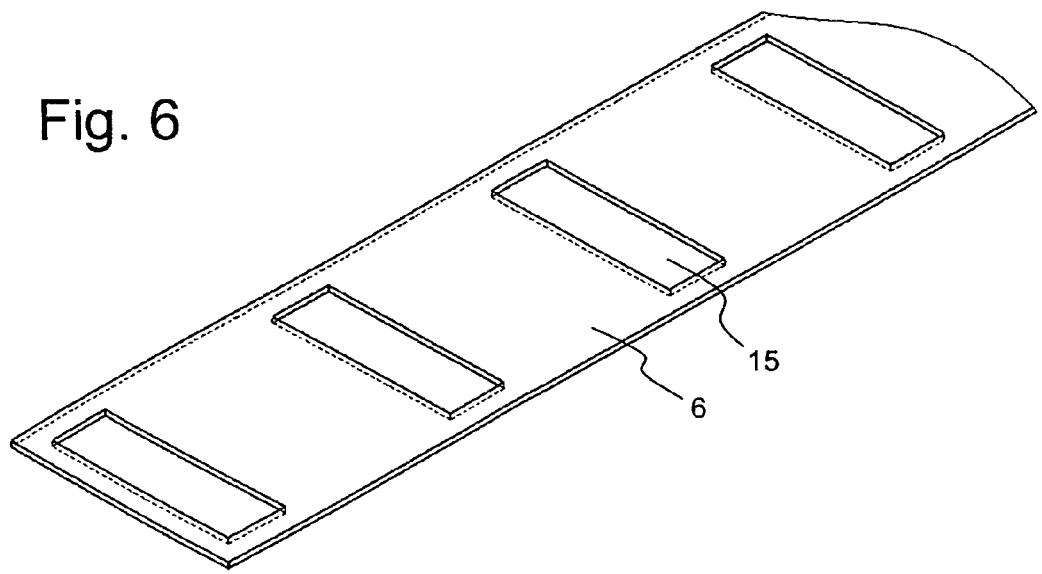
FIG. 6: a schematic perspective view of a carrier for an inventive current lead

FIG. 6 shows a schematic perspective view of the carrier 6 for an inventive current lead that is comparable with the carrier 6 from FIG. 2b. The essentially flat, elongated, cuboidal carrier 6 has a plurality of cut-outs 15 that are distributed over the longitudinal extent, cut through the full height of the carrier, and leave lateral webs (to ensure mechanical integrity).

Figure 7:
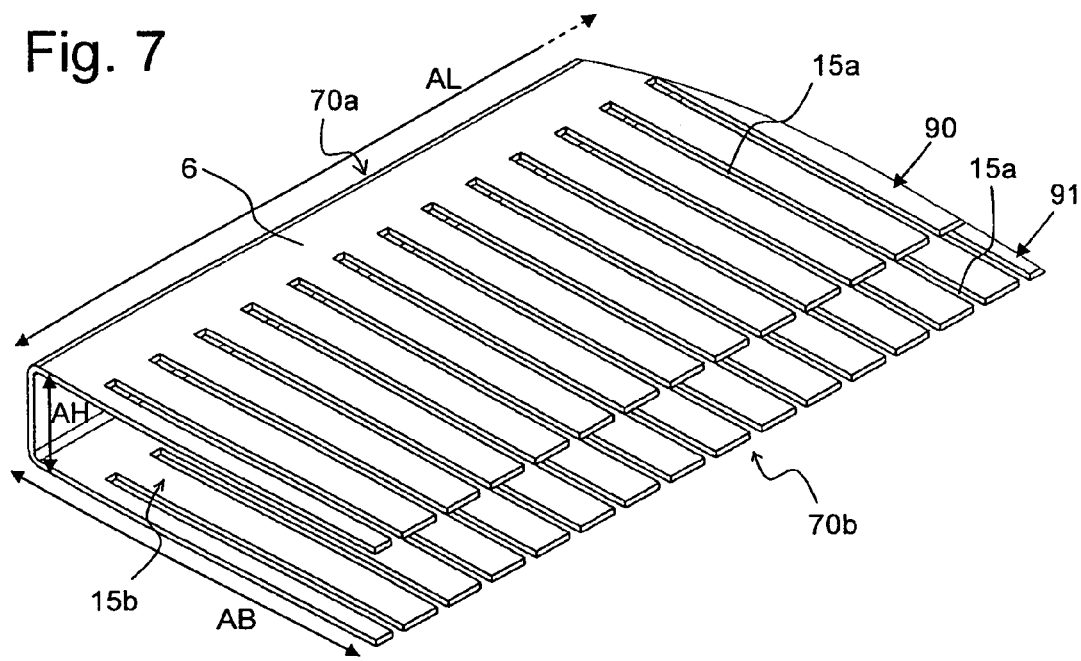
FIG. 7: a schematic perspective view of a further carrier for an inventive current lead, based on a U-section, with comb-like outer sides.

FIG. 7 shows a perspective view of a further carrier 6 for an inventive current lead.

The carrier 6 is based on a U-section that has its base at the upright side 70a, and is open at the opposite upright side 70b. The legs of the U-section constitute the top side and underside (outer sides) 90, 91 of the carrier 6 on which the HTSCs are disposed (not shown).

The outer sides 90, 91 are provided, starting from the upright side 70b facing away from the base, with slot-like cut-outs 15a extending in the transverse direction. The slot-like cut-outs 15a reduce the thermal conductivity of the carrier 6 in the longitudinal direction considerably. The open region in the interior of the U-section of the carrier 6 forms the greatest cut-out 15b in the space (volume) defined by the outer width AB, outer height AH, and the outer length AL of the carrier 6 of FIG. 7.

In the case of the carrier 6 based on a U-section, occupancy of the space defined by the outer width AB, the outer height AH, and the outer length AH by carrier material is especially low, that is, this defined space is mainly occupied by the cut-outs 15a, 15b (more than 90% in this case) and thermal conduction is therefore correspondingly low.

The outer height AH is the height range over which the high-grade steel carrier 6 extends (seen over the entire longitudinal extent of the carrier 8). The outer width AB is the width range over which the high-grade steel carrier 6 extends (seen over the entire longitudinal extent of the carrier 6). The outer length AL is the length range over which the high-grade carrier 6 extends (seen over the entire vertical extent and longitudinal extent of the carrier 6). The outer height AH, outer width AB, and outer length AL are measured at right angles. A flat, elongated cuboid is constituted by the outer length AL, the outer width AB, and the outer height AH lying against the outer contours of the carrier 6 ("defined space"), into which the carrier 6 just about fits.

Figure 8A:
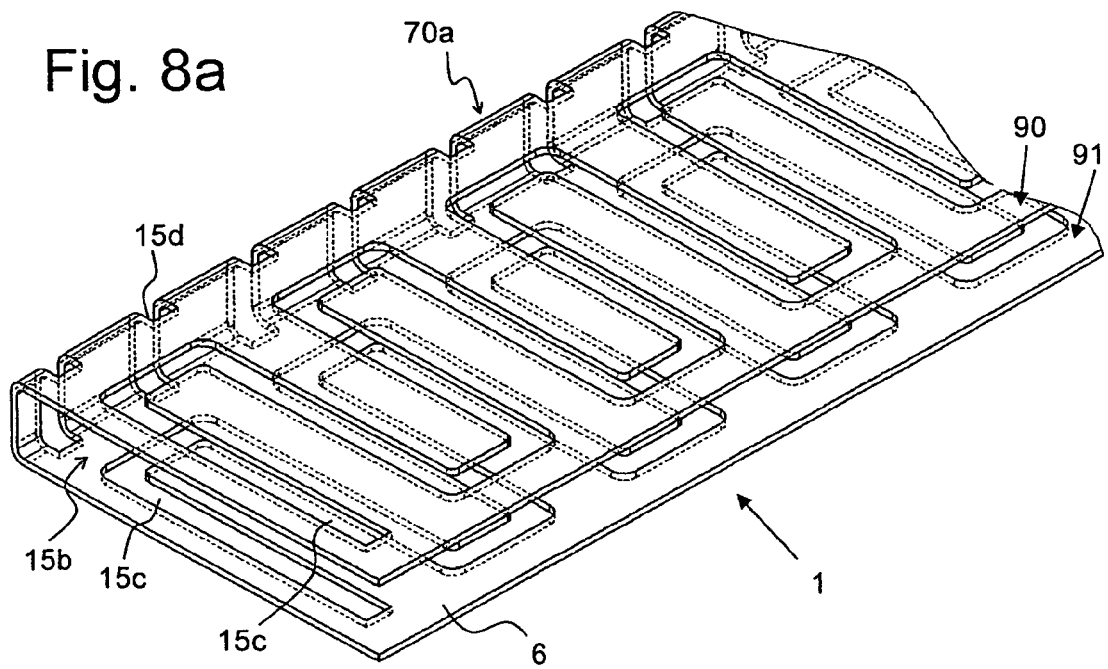
FIG. 8a: a schematic perspective view of a further inventive current lead, based on a U-section with meander-shaped slots in the outer sides, shown without HTSCs.
Figure 8B:
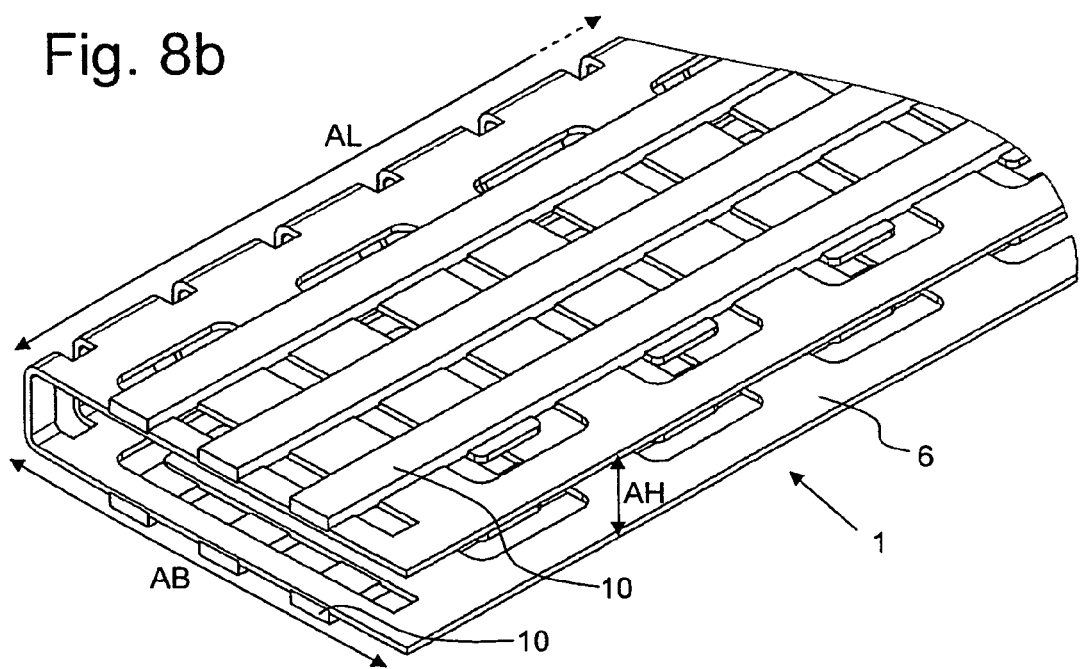
FIG. 8b: the current lead of FIG. 8b, shown with HTSCs.

A further embodiment of an inventive current lead 1 is shown in FIG. 8a (without HTSCs) and FIG. 8b (with HTSCs).

The current lead 1 again has a carrier 6 based on a U-section (similar to the carrier in FIG. 7). The legs of the U-section constitute the top side and underside (outer sides) 90, 91 of the carrier 6 on which the HTSCs 10 are disposed.

The outer sides 90, 91 each have a cut-out 15c, in the shape of meander-shaped slots. This reduces the thermal conduction in the carrier 6 in the longitudinal direction (toward the outer length AL).

Furthermore, gap-like cut-outs (slots) 15d are provided that extend transversely with respect to the longitudinal direction in the base-side upright side 70a of the U-section-like carrier 6. This reduces the thermal conduction in the longitudinal direction in the region of the base, too.

The largest cut-out 15b is constituted by the free region in the interior of the U-section of the carrier 6.

Note that on an inventive current lead for protecting the HTSC and for electrical insulation, the HTSC tape conductor region can be encapsulated in epoxy resin, such as Stycast 1266, and/or wrapped in Kapton tape.

| List of reference symbols | |
|---|---|
| 1 | Current lead |
| 2 | Conductor |
| 3 | Current source |
| 3a | Current feed point |
| 4 | Conductor |
| 5 | Superconducting load system |
| 5a | Connection for cryocooler |
| 5b | Connection for cryocooler |
| 6 | Carrier |
| 7 | Connection element |
| 8 | Drill-hole |
| 9 | Potential tap |
| 10 | HTSC |
| 11 | Longitudinal slot |
| 15 | Cut-out |
| 15a-15d | Cut-out |
| 16, 16a | Soldered connection |
| 20 | Section |
| 70a, 70b | Upright side |
| 90 | Outer side |
| 91 | Outer side |
| AB | Outer width |
| AH | Outer height |
| AL | Outer length |

We claim:

1. A current lead for a superconducting load system or a magnet coil, to a current feed point that is at a higher temperature than the load system, the current lead comprising:
   a flat, elongated stainless steel carrier constituted in a shape of a plate having cut-outs; and
   a plurality of mechanical and electrical parallel high-temperature superconductors (=HTSCs), wherein said HTSCs are each disposed side by side on two opposite sides of said carrier.

2. The current lead of claim 1, wherein at least 40% of a space defined by an outer length, an outer width, and an outer height of said carrier is occupied by cut-outs.

3. The current lead of claim 1, wherein at least 60% of a space defined by an outer length, an outer width, and an outer height of said carrier is occupied by cut-outs.

4. The current lead of claim 1, wherein one or more sections of a length of said carrier are provided in which at least 70% of a cross-sectional area defined by an outer width and an outer height of said carrier is occupied by cut-outs.

5. The current lead of claim 1, wherein at least 85% of a cross-sectional area defined by an outer width and an outer height of said carrier is occupied by cut-outs.

6. The current lead of claim 1, wherein said carrier is constituted in a shape of a meander.

7. The current lead of claim 1, wherein at least some of said cut-outs are constituted as slots in a longitudinal direction of said carrier in each of which, one HTSC is disposed.

8. The current lead of claim 1, wherein said carrier is made of a U-section that is open at one upright side of said carrier.

9. The current lead of claim 8, wherein outer sides of said U-section each have meander-shaped slots.

10. The current lead of claim 8, wherein on a base side of said U-section, slots distributed over a longitudinal direction of said carrier are provided that are transverse with respect to said longitudinal direction.

11. The current lead of claim 1, wherein the current lead has two connection elements that are soldered to said carrier in a region of longitudinal ends of said carrier.

12. The current lead of claim 11, wherein said connection elements are made of copper.

13. The current lead of claim 1, wherein said HTSCs are constituted in a shape of strips.

14. The current lead of claim 13, wherein said strips are flat on a carrier side.

15. The current lead of claim 1, wherein the HTSCs contain Bi-2212, Bi-2223, YBCO or $MgB_2$.

16. The current lead of claim 15, wherein said Bi-2212 or said Bi-2223 is of type PIT (powder in tube) with an Ag or Ag/Au coating.

17. The current lead of claim 15, wherein said YBCO is of a coated conductor type.

\* \* \* \* \*